April 1, 1924.

T. R. COOK

COVER FOR STORAGE BATTERY CELLS

Filed July 28, 1920

1,488,632

Thomas R. Cook, INVENTOR.

BY

A. L. Vencill, ATTORNEY.

Patented Apr. 1, 1924.

1,488,632

UNITED STATES PATENT OFFICE.

THOMAS R. COOK, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

COVER FOR STORAGE-BATTERY CELLS.

Application filed July 23, 1920. Serial No. 399,461.

*To all whom it may concern:*

Be it known that THOMAS R. COOK, a citizen of the United States, residing at Pittsburgh, in the county of Allegheny and State of Pennsylvania, has invented certain new and useful Improvements in Covers for Storage-Battery Cells, of which the following is a specification.

My invention relates to cell covers for storage batteries.

I will describe one form of cover embodying my invention, and will then point out the novel features thereof in claims.

Figure 1:
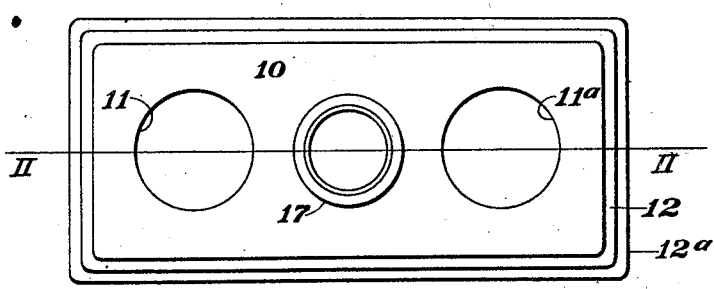
Figure 2:
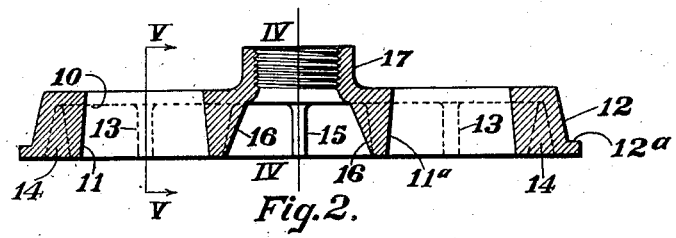
Figure 3:
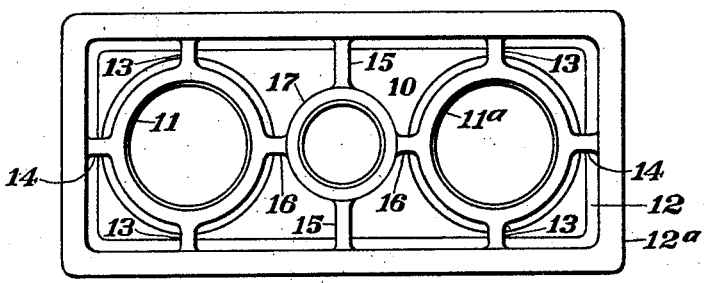
Figure 4:
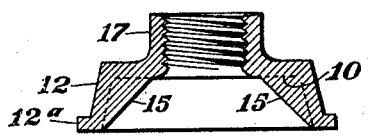
Figure 5:
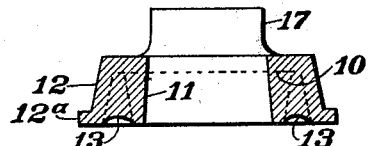

In the accompanying drawing, Fig. 1 is a top view of one form of cover embodying my invention. Fig. 2 is a sectional view taken on the line II—II of Fig. 1. Fig. 3 is a bottom view of the cover. Fig. 4 is a transverse sectional view on the line IV—IV of Fig. 2, and Fig. 5 is a transverse sectional view on the line V—V of Fig. 2 looking in the direction of the arrows.

Similar reference characters refer to similar parts in each of the several views.

Referring to all of the views, the cover, which is preferably a single integral piece of hard rubber, comprises a plate 10 provided with two downwardly projecting sockets 11 and 11$^a$ which accommodate the two terminal posts of the cell. The entire periphery of the plate 10 is provided with a downwardly projecting flange 12, the lower edge of which carries a short horizontal flange 12$^a$. The flange 12 flares outwardly from the plate 10, and the outer edge of the horizontal flange 12$^a$ is designed to fit snugly into the cell jar, leaving a space between the jar and the flange 12 to receive sealing compound in the usual manner.

As here shown, the lower rim of each socket 11, 11$^a$ is flush with the lower edge of the flange 12.

Each socket 11 and 11$^a$ is connected with the flange 12 by two transverse ribs 13 and by a longitudinal rib 14. The cover is further strengthened by two middle transverse ribs 15, and two small longitudinal flanges 16 connecting the plate 10 and the sockets 11, 11$^a$.

Located in the middle of the cover is an upstanding socket 17 which is provided with internal screw threads to receive the usual vent plug (not shown in the drawing).

One feature of my invention is the provision of a cover which is so constructed that when two or more of the covers are packed for shipment they will nest into the smallest possible space. That is, the covers are so designed that the entire socket 17 of each cover will fit into the cover next above it. To accomplish this, I make the depth of the flange 12 and of the sockets 11, 11$^a$ at least as great as the height of the socket 17, and I cut away the middle ribs 15 and 16 as shown in Figs. 4 and 2 so that they will not interfere with the socket 17 of the cover next below. When constructed in this manner, a plurality of covers may be packed for shipment with the lower rims of the flange and of the sockets 11, 11$^a$, of each cover resting directly on the top of the plate 10 of the cover next below, and so the covers occupy the minimum amount of space.

A further advantage which follows from cutting away the ribs 15 and 16 is a reduction of the obstructions to vision, thereby permitting better inspection, through the socket 17, of the parts within the battery jar.

Although I have herein shown and described only one form of cover embodying my invention, it is understood that various changes and modifications may be made therein within the scope of the appended claims without departing from the spirit and scope of my invention.

Having thus described my invention, what I claim is:

1. A storage battery cell cover comprising a plate provided with a depending flange, reinforcing ribs, and an upstanding vent plug socket, said ribs being cut away so that when two such covers are nested together the ribs of the upper cover do not interfere with the socket of the lower cover.

2. A storage battery cell cover comprising a plate provided with depending terminal post sockets and a depending peripheral flange, reinforcing ribs connecting said sockets with said plate and flanges, and an upstanding vent plug socket, the depth of said terminal post sockets being at least as great as the height of the vent plug socket, certain of said ribs being cut away so that when two covers are nested together the ribs of the upper cover do not interfere with the vent plug socket of the lower cover.

3. A storage battery cell cover comprising a plate provided with reinforcing ribs and with a vent plug socket, said ribs being cut away to permit unobstructed vision through said socket.

4. A storage battery cell cover comprising a plate provided with a peripheral depending flange and with an upstanding vent plug socket, the depth of said flange being at least as great as the height of said socket, and the portion of the plate beneath said socket being free and unobstructed so that when two such covers are nested together the socket on the lower cover does not prevent the flange of the upper cover from resting on the plate of the lower cover.

In testimony whereof I affix my signature.

THOMAS R. COOK.